- △ : NONE ADDED
- ○ : DIBUTYL-TIN DILAURATE
- × : SODIUM METABISULPHITE
- ● : SODIUM METABISULPHITE/DIBUTYL-TIN DILAURATE
  (MIXING RATIO = 1/1, 1/3, 3/1, 1/5, 5/3)

United States Patent Office 3,630,978
Patented Dec. 28, 1971

3,630,978
STABILIZED HALOGEN-CONTAINING ACRYLO-
NITRILE POLYMER COMPOSITION
Iyohiko Nakanome, Kenji Takeya, and Hiroshi Suzuki,
Okayama, Japan, assignors to Japan Exlan Company
Limited
Filed Sept. 15, 1969, Ser. No. 857,746
Claims priority, application Japan, Sept. 13, 1968,
43/66,388
Int. Cl. C08f 45/62
U.S. Cl. 260—23 A       12 Claims

ABSTRACT OF THE DISCLOSURE

Discoloration of aqueous solutions of acrylonitrile polymers by heat and/or aging, particularly those polymers containing halogen, is prevented by the addition thereto of a combination of a water-soluble inorganic bisulfite and either a triorganophosphite or an organotin carboxylate.

---

Figure 1:
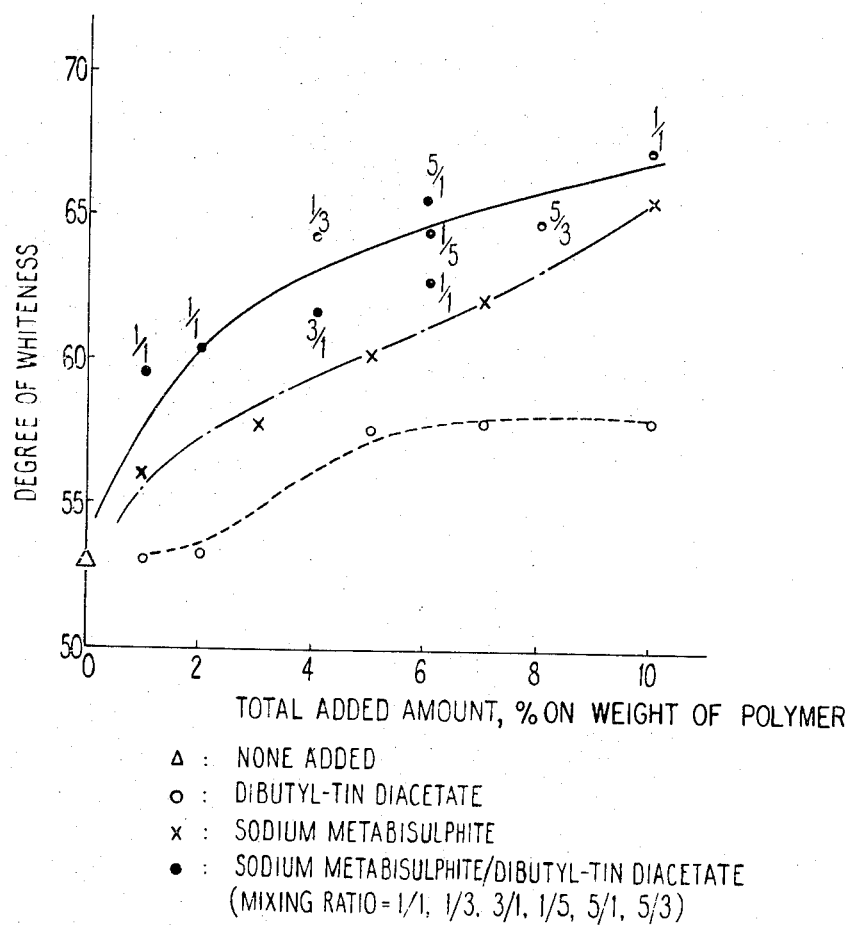

This invention relates to a stabilized halogen-containing acrylonitrile polymer composition and more particularly to the coloring stabilization of a solution containing a halogen-containing acrylonitrile polymer and of articles shaped from said solution.

In shaping fibers or filaments from an acrylonitrile polymer, it is necessary to heat and dissolve said polymer in a proper solvent and maintain said solution at a high temperature for a long time or, for example, to deaerate the solution at higher temperatures and heat it before extruding the same into a coagulating bath.

During the above mentioned or other operations of heating an acrylonitrile polymer solution, said solution will gradually darken and will have a great influence on the hue of the product made therefrom. Further, even in case said solution is not heated, when it is stored for a long time, it will discolor. Therefore, it has been necessary to shape fibers within a comparatively short time. Such coloring phenomenon as is mentioned above is remarkable particularly in a halogen-containing acrylonitrile polymer solution. Thus coloring is recognized in the product made from said solution and the commodity value will be reduced. Generally, the cause of discoloration in an acrylonitrile polymer solution is not exactly clear. However, the discoloration phenomenon in a halogen-containing acrylonitrile polymer solution is particularly more remarkable than that of a solution of an acrylonitrile polymer containing no halogen. It has been found that, when a halogen-containing monomer is introduced into an acrylonitrile polymer, the color stability of a solution of the polymer will be reduced. Therefore, in shaping such articles as fibers having no undesirable coloring from a halogen-containing acrylonitrile polymer solution, there must be attained a binary object of preventing the discoloration phenomenon of the acrylonitrile polymer solution and at the same time reducing the discoloration phenomenon accelerated by the introduction of the halogen-containing monomer.

As regards the color stabilization of acrylonitrile polymer solutions, such means are known as the addition of a water-soluble inorganic bisulfite as taught by U.S. Pats. 2,946,761 and 2,946,762 or the addition of a triorganophosphite as disclosed by U.S. Pat. 3,055,861. However, while such bisulfite has some effect on the color stabilization of halogen-containing acrylonitrile polymer solutions and therefore on the color stabilization of fibers made from said solution, it is necessary, in order to attain a color stabilizing effect favorable enough, to use such a large amount of a bisulfite as will adversely affect the resulting product or processes. Therefore, it cannot be said to be a favorable color stabilizer. The above-mentioned triorganophosphite has been added to halogen-containing acrylonitrile polymer solutions and has been found to exert some extent of color stabilizing effect upon the solutions, but the fiber formed from a halogen-containing acrylonitrile polymer solution which contains said triorganophosphite still assumes an appreciable degree of yellowness.

As a result of research on the color stabilization of halogen-containing acrylonitrile polymer solutions and such articles as fibers shaped therefrom, we have discovered that, by using both a water-soluble inorganic bisulfite and a compound selected from the class consisting of triorganophosphites and organotin carboxylates, there can be obtained a color stabilizing effect which is far higher than the effect obtained by respectively singly adding said water-soluble inorganic bisulfite, triorganophosphite or organotin carboxylate.

A principal object of the present invention is to provide a halogen-containing acrylonitrile polymer solution having improved tone characteristics and an article shaped from said solution.

Another object of the present invention is to reduce the discoloration of an acrylonitrile polymer composition occurring with the lapse of time or particularly to reduce the coloring when the polymer solution is left to stand for a long time or at higher temperatures.

Figure 2:
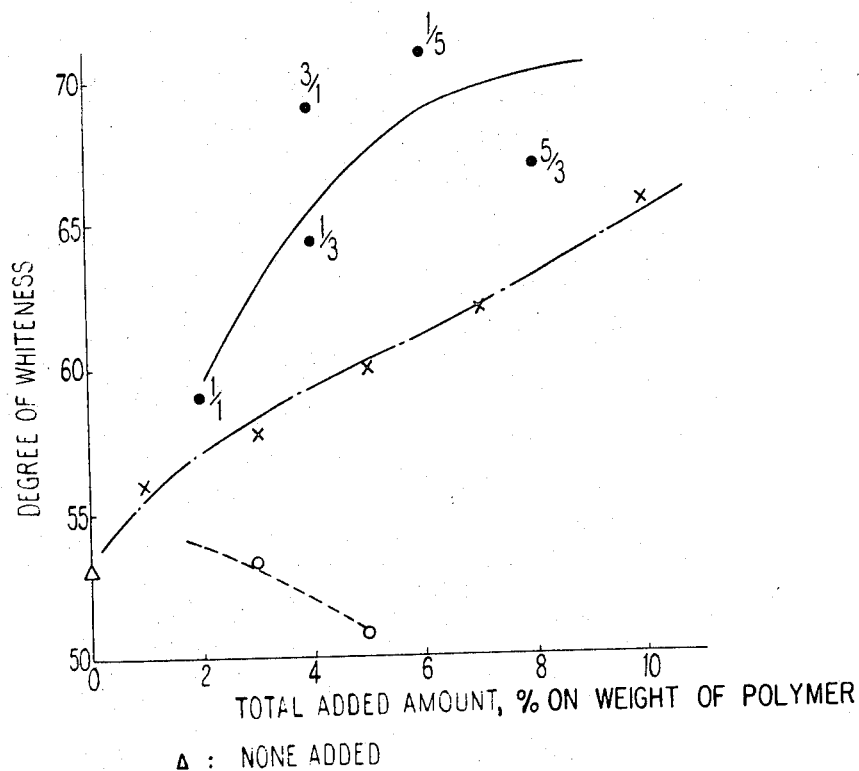

Other objects of the present invention will become clear from the following explanation which will be made by referring partly to the accompanying drawings wherein FIGS. 1 and 2 show the whiteness of fibers shaped from halogen-containing acrylonitrile polymer solutions to which a water-soluble inorganic bisulfite and an alkyltin carboxylate have been added singly or together in various amounts.

The objects of the present invention are attained by dissolving a halogen-containing acrylonitrile polymer into an aqueous solvent in the presence of a water-soluble inorganic bisulfite and a compound selected from the class consisting of triorganophosphites and organotin carboxylates. More particularly, the objects of the present invention are attained by adding 0.1 to 10%, by weight of a halogen-containing acrylonitrile polymer on a net-dry basis, of a water-soluble inorganic bisulfite and 0.1 to 10%, by weight of said halogen-containing acrylonitrile polymer on a net-dry basis, of a compound selected from the class consisting of triorganophosphites and organotin carboxylates in the halogen-containing acrylonitrile polymer solution.

The addition of less than 0.1% of each of said water-soluble inorganic bisulfite and compound selected from the class consisting of triorganophosphites and organotin carboxylates is not sufficient in stabilizing the discoloration of the halogen-containing acrylonitrile polymer solution. The addition of more than 10% of each of them will only deteriorate the physical properties of the shaped articles and no additional advantage is obtained.

The water soluble inorganic bisulfite and a compound selected from triorganophosphites and organotin carboxylates may be used at any ratio. These two kinds of color stabilizers may be added separately or as mixed before, during or after dissolving the halogen-containing acrylonitrile polymer into an aqueous medium. In the preferred compositions of the invention the solution is adjusted to a pH value within the range of from 3.0 to 7.0, and preferably to a pH ranging between 3.5 and 5.0.

The combined use of the water-soluble inorganic bisulfite and compound selected from the group consisting of triorganophosphites and organotin carboxylate shows a color stabilizing effect far higher than in respectively singly using said two kinds of coloring stabilizers, and such articles as fibers made from the composition of this invention have an improved whiteness. Since conventional halogen-containing acrylonitrile polymer fibers are yellowed, it will be difficult to obtain a bright tone or shade when they are dyed in a light color. When fibers shaped from a polymer composition of the invention are dyed in a light color, they will have a very bright tone.

Further, such articles as fibers shaped from the polymer composition of the present invention consist of a halogen-containing acrylonitrile polymer and therefore have also an excellent flame retardancy.

Typical examples of water-soluble inorganic bisulfites which can be used as additives into a solution in the form of water-soluble inorganic bisulfites or metabisulfites or as hydrates are such alkali metal bisulfites as of sodium, potassium, lithium, cesium and rubidium, ammonium bisulfite, corresponding metabisulfites (anhydrous forms of bisulfites) and hydrates of the above mentioned bisulfites.

The triorganophosphites which are used in conjunction with said water-soluble inorganic bisulfites are represented by the following general Formula I:

(wherein $R_1$, $R_2$ and $R_3$, respectively, are selected from the class consisting of alkyl, alkenyl, aryl, aralkyl, cycloalkyl and cycloalkenyl groups which are either substituted or unsubstituted, said groups respectively having up to 22 carbon atoms). More specifically, said $R_1$, $R_2$ and $R_3$ include, for example, methyl, ethyl, butyl, pentyl, hexyl ethylhexyl, isooctyl, decyl, dodecyl, hexadecyl, propenyl, methylpropenyl, butenyl, pentenyl, hexenyl, octadecenyl, cyclopentyl, cyclohexyl, cyclohexenyl, phenyl, biphenyl, naphthyl, methylphenyl, ethylphenyl, phenylethyl, phenylhexyl, cyclohexylphenyl, hydroxyethyl, hydroxydodecyl, methoxyethyl, ethoxybutyl, phenoxyhexyl, carboethoxyethyl, propionoxyoctyl, benzoxylhexyl, ethoxybutenyl, phenoxybutenyl, carboethoxyhexenyl, propionoxyphentenyl, benzoxyhexenyl, hydroxyphenyl, methoxyphenyl and carboethoxyphenyl groups. And $R_1$, $R_2$ and $R_3$ may be the same groups or different groups). Among the above-mentioned phosphites, triethylphosphite, tris-$\beta$-chloroethyl phosphite, triisopropylphosphite, tri-n-butyl phosphite and tribenzyl phosphite are particularly effective.

Further, as organotin carboxylates to be used together with the above mentioned water-soluble inorganic bisulfites, may be mentioned dibutyl-tin diacetate, dibutyl-tin dilaurate, dibutyl-tin maleate, dibutyl-tin bismonomethyl maleate, dibutylmethyl tin bis-alpha-ethyl hexanoate and tribenzyl tin laurate.

The aqueous solvent as used in the present invention means a solvent consisting of a concentrated aqueous solution of a water-soluble salt producing highly hydrated ions in an aqueous solution such as, for example, a chloride, bromide, iodide, thiocyanate, perchlorate or nitrate. Specific examples of such water-soluble inorganic salts are zinc chloride, calcium chloride, lithium bromide, cadmium bromide, cadmium iodide, sodium thiocyanate, calcium thiocyanate, potassium thiocyanate, zinc thiocyanate, aluminum perchlorate, calcium perchlorate, calcium nitrate and zinc nitrate. The most preferable aqueous medium or aqueous solvent is a concentrated aqueous solution of a thiocyanate. The concentration of the above mentioned water-soluble salt in water should be sufficiently high that the resulting aqueous solution would dissolve the halogen-containing acrylonitrile polymer. In most cases, the concentration of this water-soluble salt is substantially more than 40% (for example, 45–50% to 55–60%) on the total weight as dissolved in water. The upper limit is the saturation of the particular salt in water. Further, a water-soluble organic liquid such as alcohol, acetone, etc. may well be added to said aqueous solvent in order to improve such properties as the solubility and spinnability of the polymer.

The concentration of the halogen-containing acrylonitrile polymer in the aqueous solvent depends, for example, upon the particular solvent and extrusion apparatus to be employed in making a filamentary material or other shaped article from the solution, the diameter of the fiber or other article to be extruded and the average molecular weight of the polymer. The concentration may range, for example, from about 5% to about 20% by weight of the composition, that is, by weight of the total amount of polymer, solvent for the polymer, water-soluble inorganic bisulfite, and compound selected from the class consisting triorganophosphite and organotin carboxylate. In most cases the concentration of the polymer in the solvent will be within the range of from about 6% or 7% up to about 15% or 16% by weight of the solution. The stabilized halogen-containing acrylonitrile polymer solution according to the present invention may be extruded into a coagulating bath by known process (e.g. U.S. Pat. 2,558,730) to form fibers having an improved whiteness.

EXAMPLE 2

The term "halogen-containing acrylonitrile polymers" as used in the present invention means those copolymers comprising acrylonitrile and one or more halogen-containing vinyl monomers such as vinylidene chloride, vinylidene fluoride, vinyl chloride, vinyl fluoride or vinyl bromide, etc., as well as copolymers comprising acrylonitrile, one or more said halogen-containing vinyl monomers, and one or more of other monoethylenically unsaturated monomers.

Particularly in the present application, the color stabilizing effect on a solution of an acrylonitrile polymer containing vinylidene chloride as a halogen-containing vinyl monomer is remarkable.

It is preferable that the halogen-containing acrylonitrile polymer to be used in the present invention contains at least 70% by weight acrylonitrile, 5% to 15% by weight of said halogen-containing vinyl monomers and less than 15% by weight of one or more of other monoethylenically unsaturated monomers.

Further, as monoethylenically unsaturated monomers to be introduced as copolymerizing components are included acrylic acid; methacrylic acid; such acrylic esters as ethyl acrylate, methyl acrylate, butyl acrylate, octyl acrylate, methoxymethyl acrylate, phenyl acrylate, cyclohexyl acrylate and dimethylaminoethyl acrylate; such methacrylic esters as methyl methacrylate, ethyl methacrylate, butyl methacrylate, octyl methacrylate, methoxyethyl methacrylate, phenyl methacrylate, cyclohexyl methacrylate and dimethylaminoethyl methacrylate; acrylic acid amides and methacrylic acid amides or their N-alkyl substituents; such unsaturated ketones as methyl vinyl ketone, phenyl vinyl ketone and methyl isopropenyl ketone; such vinyl esters of saturated carboxylic acids as vinyl formate, vinyl acetate, vinyl propionate, vinyl butyrate, vinyl thiolacetate and vinyl benzoate; N-alkyl-maleinimides, N - vinylcarbazole, N - vinylsuccinimide, N-vinylphthalimide and vinyl ethers; such vinylpyridines as 2-vinylpyridine, 4-vinylpyridine, 2-methyl-5-vinyl-pyridine; styrene and its alkyl substituents; allyl alcohol; such unsaturated sulfonic acids as allyl sulfonic acid, methallyl sulfonic acid and styrenesulfonic acid and their salts; such cyclic compounds as betapropiolactone; such unsaturated aldehydes as acrolein and methacrolein and such phosphoric unsaturated compounds as diethylvinyl phosphonate and diphenylvinyl phosphine.

The below mentioned examples are shown to better explain the present invention and do not limit the scope of the present invention. The percentages and parts shown in the examples are all by weight unless otherwise specified. The molecular weights given in the examples are the values calculated from the viscosity values obtained in dimethylformamide at 30° C. by means of Staudinger's equation.

EXAMPLE 1

Ten parts of a copolymer (molecular weight 53,000) consisting of 82.1% acrylonitrile, 8.1% methyl acrylate and 9.8% vinylidene chloride were added to 90 parts of a 52% sodium thiocyanate aqueous solution. Further, sodium metabisulfite and dibutyl-tin diacetate were added thereto respectively singly or as combined at such various rates (on the weight of the purely dry polymer) as in Table 1 and the mixture was heated to 40° C. Each of the various spinning solutions were extruded into a coagulating bath of an aqueous solution of 12% sodium thioncyanate at −2° C. by using a spinnerette of 50 orifices of a diameter of 0.15 mm. The formed filaments were washed with water, then stretched 10 times the length in boiling water and were wet-heat-relaxed at a temperature of 122° C. to get a shrinkage of 30%. The whiteness of the resulting fibers of 15 deniers was measured. The results are shown in Table 1 and FIG. 1.

As evident from Table 1 and FIG. 1, the combined use of sodium metabisulfite and dibutyl-tin diacetate is far more effective to the prevention of discoloration of fibers than using them respectively singly.

By the way, in the whiteness measuring method according to this example, the degree of whiteness was calculated by the below mentioned formula by measuring L, $a$ and $b$ by using a Hunter type color difference meter (Model CM20 manufactured by Japan Color Machine Company). The test was made 5 times and the average value was taken. It is shown that, the higher the value, the higher the whiteness.

$$\text{Degree of whiteness} = 100 - \{(100-L)^2 + a^2 + b^2\}^{1/2}$$

TABLE 1

Amount (based on weight of polymer) of each color stabilizer

| Percent Na$_2$S$_2$O$_5$(A) | Percent dibutyl-tin diacetate (B) | Total amount, percent | Mixing ratio (A/B) | Degree of whiteness |
|---|---|---|---|---|
| | | | | 53.0 |
| 1 | | 1 | | 56.5 |
| 3 | | 3 | | 57.5 |
| 5 | | 5 | | 59.5 |
| 7 | | 7 | | 61.5 |
| 10 | | 10 | | 65.0 |
| | 1 | 1 | | 53.0 |
| | 2 | 2 | | 53.2 |
| | 5 | 5 | | 57.0 |
| | 7 | 7 | | 57.2 |
| | 10 | 10 | | 57.3 |
| 0.5 | 0.5 | 1 | 1/1 | 59.5 |
| 1 | 1 | 2 | 1/1 | 61.3 |
| 1 | 3 | 4 | 1/3 | 64.0 |
| 3 | 1 | 4 | 3/1 | 61.5 |
| 1 | 5 | 6 | 1/5 | 64.0 |
| 3 | 3 | 6 | 1/1 | 62.3 |
| 5 | 1 | 6 | 5/1 | 65.2 |
| 5 | 3 | 8 | 5/3 | 64/5 |
| 5 | 5 | 10 | 1/1 | 67.0 |

Various fibers were made by using exactly the same polymers and recipes as in Example 1 except that dibutyl-tin dilaurate was used instead of dibutyl-tin diacetate. The results of degree of whiteness of the fibers are shown in Table 2 and FIG. 2. In FIG. 2, it is shown that the combined use of sodium metabisulfite and dibutyl-tin dilaurate is very effective to the prevention of discoloration of fibers.

TABLE 2

Amount (based on weight of polymer) of each color stabilizer

| Percent Na$_2$S$_2$O$_5$ (A) | Percent dibutyl-tin diacetate (B) | Total amount, percent | Mixing ratio (A/B) | Degree of whiteness |
|---|---|---|---|---|
| | | | | 53.0 |
| 1 | | 1 | | 56.5 |
| 3 | | 3 | | 57.5 |
| 5 | | 5 | | 59.5 |
| 7 | | 7 | | 61.5 |
| 10 | | 10 | | 65.0 |
| | 3 | 3 | | 53.5 |
| | 5 | 5 | | 51.0 |
| 1 | 1 | 2 | 1/1 | 58.5 |
| 1 | 3 | 4 | 1/3 | 64.5 |
| 3 | 1 | 4 | 3/1 | 69.0 |
| 1 | 5 | 6 | 1/5 | 71.0 |
| 5 | 3 | 8 | 5/3 | 67.0 |

EXAMPLE 3

Ten parts of a copolymer (molecular weight 52,000) containing 83% of acrylonitrile, 7% of methyl acrylate and 10% of vinylidene chloride was added to 90 parts of 50% aqueous solution of sodium thiocyanate, followed by the addition of the water-soluble inorganic bisulfites or/and triorganophosphites set forth in Table 3. Each sample was heated to 65° C. and the absorbancy ($-\log T$) of the resulting solution was measured at the wavelength of 420 m$\mu$. The results are shown in Table 3. The above solution was allowed to stand at 50° C. for 100 hours, at the end of which time its absorbancy ($-\log T$) at the wavelength of 420 m$\mu$ was measured again. The result is also set forth in Table 3. The higher the absorbancy value, the more intensely colored, or yellowed, the solution. The water-soluble inorganic bisulfites and triorganophosphites were used in such amounts that, when each of them is single employed, it was equivalent to 6% relative to the dry weight of the pure polymer or when two of them were used in conjunction, 3% each of the two compounds or a total of 6 percent, was employed.

It will be apparent from Table 3 that the present method, i.e. where a water-soluble inorganic bisulfite is used in combination with a triorganophosphite, is considerably more effective in the prevention of discoloration of the solution than the method in which either one of them is singly employed.

TABLE 3

| Color stabilizer | Amount, percent | Absorbancy immediately after dissolving ($-\log T$) | Absorbancy after standing 100 hours at 50° C. ($-\log T$) |
|---|---|---|---|
| Control: | | | |
| No addition | | >2 | >2 |
| NaHSO$_3$ | 6 | 1.0 | 1.3 |
| Na$_2$S$_2$O$_5$ | 6 | 1.1 | 1.4 |
| Tri-n-butylphosphite | 6 | 1.1 | 1.4 |
| Triethylphosphite | 6 | 1.3 | 1.5 |
| Triisopropyl phosphite | 6 | 1.6 | 1.9 |
| Tris-$\beta$-chloroethylphosphite | 6 | 1.1 | 1.5 |
| This invention: | | | |
| NaHSO$_3$ plus tri-n-butylphosphite | [1]3 | 0.90 | 1.1 |
| Na$_2$S$_2$O$_5$ plus triisopropyl phosphite | [1]3 | 0.90 | 1.0 |
| Na$_2$S$_2$O$_5$ plus tris-$\beta$-chloroethyl phosphite | [1]3 | 0.90 | 1.1 |
| Na$_2$S$_2$O$_5$ plus triethylphosphite | [1]3 | 1.0 | 1.2 |

[1] Each.

EXAMPLE 4

Nine parts of a copolymer (molecular weight 53,000) consisting of 83% acrylonitrile, 7% of methyl acrylate and 10% of vinylidene chloride was added to 91 parts of 51% aqueous solution of sodium thiocyanate, followed by the addition of sodium metabisulfite and tri-n-butyl phosphite in amounts of 3 percent each relative to the dry weight of the polymer (or a total of 6% of the additives). The mixture was heated to 60° C., and the resulting solution was extruded through a spinnerette nozzle having 50 orifices, each 0.15 mm. in diameter, into a coagulating bath consisting of a 12% aqueous solution of sodium thiocyanate. After washed with water, the tow was stretched in boiling water to 10 times its initial length, followed by a relaxing treatment under hot, humid conditions at 125° C., whereby the fiber was allowed to shrink by 30%. The whiteness of the fiber was 81.3. As a control, the fibers produced from the solutions to which the sodium metasulfite and tri-n-butylphosphite had been singly added in respective amounts of 6% relative to the dry weight of the polymer had the degrees of whiteness of 80.1 and 76.4, respectively. Thus, by the concurrent use of sodium metabisulfite and tri-n-butylsulfite in accordance with the invention, the synergistic effect of discoloration was prevented.

EXAMPLE 5

Ten parts of a copolymer (molecular weight 52,000) consisting of 83% of acrylonitrile, 7% of methylacrylate and 10% of vinylidene chloride was added to 90 parts of 50% aqueous solution of sodium thiocyanate, followed by the addition of sodium metabisulfite and tribenzyl phosphite in the respective amounts of 3% relative to the net dry weight of the polymer. Each of the mixtures was heated to 65° C., and the absorbancy of the resulting solution was measured in the same manner as in Example 3. As controls, the absorbancies of the solutions to which 6% of tribenzyl phosphite and 6% of sodium metabisulfite had been respectively added were also measured. Thus, the absorbancy of the solution containing 3% of sodium metabisulfite and 3% of tribenzyl phosphite was 1.07, whereas the absorbancies of the solutions containing 6% sodium metabisulfite and 6% tribenzyl phosphite, respectively, were 1.21 and more than 2, respectively. It is thus understood that the concomitant use of a water-soluble inorganic bisulfite and a triorganophosphite is quite efficient in the prevention of discoloration of halogen-containing acrylonitrile polymer solutions.

EXAMPLE 6

Ten parts of a copolymer (molecular weight 42,000) consisting of 95% acrylonitrile and 5% vinylidene chloride was added to 90 parts of 48% aqueous solution of sodium thiocyanate, followed by the simultaneous addition of 4% of sodium metabisulfite and 5% of triethyl phosphite, relative to the net dry weight of said copolymer. The mixture was heated to 60° C., and the resulting solution (A) was allowed to stand at 30° C. for a week. As controls, a solution (B) containing 4% of sodium metabisulfite alone relative to the net dry weight of said copolymer a solution (C) containing 9% of the same bisulfite, a solution (D) containing 5% of triethyl phosphite relative to the net dry weight of said copolymer, and a solution (E) containing 9% of said phosphite were prepared, and just like solution (A), those solutions were allowed to stand under equivalent conditions for a week. Whereas solution (A), on standing for a week, showed substantially no visually observable signs of discoloration, solutions (B), (C), (D) and (E) underwent obvious discoloration on a week's standing.

EXAMPLE 7

Twelve parts of a copolymer (molecular weight 85,000) consisting of 82% acrylonitrile, 8% vinylidene chloride and 10% vinyl acetate was added to 88 parts of 53% aqueous solution of calcium thiocyanate, followed by simultaneous addition of 2% of sodium metabisulfite and 1% of tri-n-butyl phosphite relative to the net dry weight of the copolymer. The mixture was heated to 65° C. and the resulting solution was allowed to stand at that temperature for 3 days. No visible signs of discoloration were observed. On the other hand, two solutions containing 3% of sodium metabisulfite and 3% of tri-n-butyl phosphite respectively were found visually to have been already discolored just after they were prepared at 65° C., and on standing at 65° C. for 3 days, it was confirmed that the solutions had been conspicuously discolored.

EXAMPLE 8

Ten parts of a quaternary copolymer (molecular weight of 61,000) composed of 80% acrylonitrile, 10.7% vinylidene chloride, 9% methyl acrylate and 0.3% sodium methallylsulfonate was added to 90 parts of 52% aqueous solution of sodium thiocyanate, followed by the addition of 7% each of potassium bisulfite and tri-n-butyl phosphite relative to the net dry weight of the copolymer (the combined total of the additives was 14%). The mixture was heated to 60° C., and the resulting solution was allowed to stand at 30° C. for a week, at the end of which time no visible signs of discoloration were observed. On the other hand, the two solutions prepared by adding 14% of sodium bisulfite and as much of tri-n-butyl phosphite, respectively, relative to the net dry weight of the copolymer were visually found to have already been discolored immediately after they were prepared at 60° C., and on a week's standing at 30° C., those solutions underwent conspicuous discoloration.

What we claim is:

1. A fiber-formable, fluid composition comprising an aqueous solution having dissolved therein a halogen-containing acrylonitrile polymer consisting of, combined in the polymer molecule, at least 70% by weight of acrylonitrile, 5% to 15% by weight of one or more halogen-containing vinyl monomers and less than 15% by weight of one or more monoethylenically unsaturated monomers, said polymer constituting from about 5% to about 20% by weight of the said composition; and, to improve the color stability of the said aqueous solution, from 0.1% to 10% of a water-soluble inorganic bisulfite and from 0.1% to 10% of a compound selected from the group consisting of triorganophosphites represented by the formula

wherein $R_1$, $R_2$ and $R_3$, respectively, are selected from the group consisting of alkyl, alkenyl, aryl, aralkyl, cyclo alkyl and cycloalkenyl groups which are either unsubstituted or substituted with a halogen atom, a hydroxy, alkoxy, phenoxy, acyloxy, benzoxy or a carboalkoxy group, said $R_1$, $R_2$ and $R_3$ groups respectively having up to 22 carbon atoms, and organotin carboxylates, relative to the net dry weight of the polymer.

2. A fiber-formable, fluid composition as in claim 1 wherein the halogen-containing vinyl monomer is selected from the group consisting of vinylidene chloride, vinylidene fluoride, vinyl chloride, vinyl fluoride and vinyl bromide.

3. A fiber-formable, fluid composition as in claim 1 wherein the aqueous solution in which the halogen-containing acrylonitrile polymer is dissolved is a solvent comprising a concentrated aqueous solution of a water-soluble salt that yields highly hydrated ions in aqueous solution, said salt being selected from the group consisting of zinc chloride, calcium chloride, lithium bromide, cadmium bromide, cadmium iodide, sodium thiocyanate, potassium thiocyanate, calcium thiocyanate, zinc thiocyanate, aluminum perchlorate, calcium perchlorate, calcium nitrate and zinc nitrate.

4. A fiber-formable, fluid composition as in claim 1 wherein the water-soluble inorganic bisulfite is an alkali-metal bisulfite.

5. A fiber-formable, fluid composition as in claim 1 wherein the water-soluble inorganic bisulfite is an alkali-metal bisulfite and the organotin carboxylate is a compound selected from the group consisting of dibutyltin tin diacetate, dibutyl-tin dilaurate, dibutyl-tin maleate, dibutyl-tin bismonomethyl maleate, dibutylmethyl-tin bis-alpha-ethyl hexanoate and tribenzyl-tin laurate.

6. A fiber-formable, fluid composition comprising an aqueous solution having dissolved therein a halogen-containing acrylonitrile polymer consisting of, combined in the polymer molecule, at least 70% by weight of acrylonitrile, 5% to 15% by weight of vinylidene chloride and less than 15% by weight of one or more monoethylenically unsaturated monomers, said polymer being dissolved in a concentrated aqueous solution of a water-soluble thiocyanate, and, from 0.1% to 10% of an alkali-metal bisulfite and from 0.1% to 10% of a compound selected from the group consisting of triethylphosphite, tri-$\beta$-chloroethyl phosphite, triisopropyl phosphite, tri-n-butyl phosphite, tribenzyl phosphite, dibutyl-tin diacetate and dibutyl-tin dilaurate, relative to the net-dry weight of the said polymer; said polymer constituting from about 5% to about 20% by weight of the said composition.

7. A fiber-formable, fluid composition as in claim 6 wherein the water-soluble thiocyanate is sodium thiocyanate.

8. A fiber-formable, fluid composition as in claim 6 wherein the alkali-metal bisulfite is sodium bisulfite.

9. A fiber-formable, fluid composition as in claim 6 which is within the pH range of from 3.0 to 7.0.

10. A fiber-formable, fluid composition as in claim 6 wherein the monoethylenically unsaturated monomer is methyl acrylate.

11. A fiber-formable, fluid composition as in claim 6 wherein one monoethylenically unsaturated monomer is vinyl acetate.

12. A fiber-formable, fluid composition as in claim 6 wherein monoethylenically unsaturated monomers are methyl acrylate and sodium methallylsulfonate.

References Cited

UNITED STATES PATENTS

| | | | |
|---|---|---|---|
| 2,868,756 | 1/1959 | Walter | 260—45.75 X |
| 2,946,761 | 7/1960 | Schuller | 260—29.6 |
| 2,946,762 | 7/1960 | Kocay | 260—29.6 |
| 3,055,861 | 9/1962 | Hersh et al. | 260—45.7 |

DONALD E. CZAJA, Primary Examiner

D. J. BARRACK, Assistant Examiner

U.S. Cl. X.R.

260—23 R, 29.6 A, 29.6 F, 45.7 P, 45.7 S, 45.75 K